US006427198B1

(12) United States Patent
Berglund et al.

(10) Patent No.: US 6,427,198 B1
(45) Date of Patent: Jul. 30, 2002

(54) METHOD, SYSTEM, AND PROGRAM FOR DETERMINING SYSTEM CONFIGURATION

(75) Inventors: Neil Clair Berglund, Kasson; Diane L. Knipfer; David Otto Lewis, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/504,766

(22) Filed: Feb. 15, 2000

(51) Int. Cl.[7] .............................................. G06F 13/00
(52) U.S. Cl. .............................. 711/170; 74/4; 74/112; 74/115; 710/8; 710/10; 710/104; 710/110
(58) Field of Search ........................... 710/8, 110, 104; 711/4, 115, 170, 112

(56) References Cited

U.S. PATENT DOCUMENTS 5,675,831 A * 10/1997 Caputo ......................... 710/10
5,898,843 A * 4/1999 Crump et al. ................ 711/112
5,909,592 A * 6/1999 Shipman ........................ 711/4

OTHER PUBLICATIONS

IBM, "Serial Presence Detect on Memory Dimms", IBM Application Note, 1997, pp. 1–5.
S. Rymenants, "The Electronic Pages", Mar. 28, 1997, pp. 1–3, [retrieved on Jan. 22, 2000] retrieved from the Internet: <URL: http://www/geocities.com/SiliconVally/9504/mic_b001.htm>.

Intel, "i960®RM/RN I/O Processor", Developer's Manual, Jul. 1998, Order No. 273158–001, pp. 22–1 –22–34.

Philips Semiconductors, "The I²C–Bus Specification", Version 2.0, Dec. 1998, pp. 1–48.

* cited by examiner

*Primary Examiner*—Than Nguyen
(74) *Attorney, Agent, or Firm*—David W. Victor; Konrad Raynes Victor & Mann, LLP

(57) ABSTRACT

Disclosed is a system, method, and program for determining the configuration of a computer system having a planar board, a planar bus, and attached planar devices. A read operation is performed on planar configuration memory indicating addresses for each planar device capable of being attached to the planar board. A read command is then sent to the address of each planar device indicated in the planar configuration memory to determine if each planar device is available. A configuration memory for each available planar device is read to determine configuration information and if there are addresses of attached devices accessible through the planar device. A read command is then sent to the address of each attached device indicated in the configuration memory of the planar device to determine configuration information for each attached device and if there are further attached devices accessible through the attached device. A read command is sent to the address of any attached device indicated in any configuration memory to determine configuration information and whether there are any further attached devices and accompanying configuration memories to consider.

25 Claims, 11 Drawing Sheets

Header Data

Vital Product Data

Location Data

110

| Card | I²C Address | Concentrator Address | Label |
|---|---|---|---|
| CPU 4 | A2 | - | M01 |
| CPU 6 | A4 | - | M02 |
| Configuration Processor 10 | A6 | | M03 |
| Riser 12 | A8 | 88 | M04 |
| Riser 14 | AA | 98 | M06 |

FIG. 3

METHOD, SYSTEM, AND PROGRAM FOR DETERMINING SYSTEM CONFIGURATION

BACKGROUND OF THE INVENTION

1. Field of the Invention

The present invention relates to a method, system, and program for determining the system configuration and, in particular, determining the available devices in the system from self-defining configuration information provided with each device.

2. Description of the Related Art

The computer architecture of certain computer systems, such as server class machines, includes a configuration processor that during initialization, such as a power-on self test (POST), performs a series of diagnostic tests to query the system components to determine the system configuration. In personal computers, this process is performed by a Basic Input/Output System (BIOS) code that determines the devices in the system. Devices that may be included in a computer system include a configuration processor that performs configuration and initialization operations during system initialization, one or more central processing units (CPUs), one or more riser cards having attached memory cards, such as dual in-line memory modules (DIMMs), and other components. Typically each card or field replaceable unit (FRU) in the system has its own EEPROM chip that includes vital product data (VPD) for the device. All the FRUs in the system communicate over a planar bus interface, such as the I$^2$C bus interface which provides a serial protocol for passing information on the bus.

In some prior art systems, the configuration processor is coded with a configuration of the devices on the planar or backplane I$^2$C bus and any further devices that may be connected at different levels to those devices. The code for the configuration processor may be maintained in a programmable memory, such as a PROM or EEPROM. For instance, a riser card on the planar I$^2$C bus may include one or more of its own I$^2$C busses. DIMM cards having their own EEPROMs with configuration information may be attached to one or more I$^2$C bus interfaces inside the riser card. The configuration processor code would include address information on all current system components on the planar I$^2$C bus and all components on any buses at different levels within a card, i.e., on I$^2$C busses within a card. During configuration, the configuration processor can then send read configuration data requests to each component to confirm that the devices are operational. One problem with coding the specific system configuration into the configuration code is that changes may be made to the system, such as inserting a new riser card having a different DIMM configuration. In such case, before the system can function with the new configuration, the configuration processor code would have to be updated to reflect this new configuration. This complicates altering the system configuration because any change will have to be accompanied by a change to the configuration processor code by modifying the configuration memory, e.g., PROM, EEPROM.

Some prior art systems encode in the configuration processor code the address of all possible components that may be attached to the system. The configuration processor will then send read configuration data requests to all possible attached systems, regardless of whether those devices are in the system, and wait for a response. Those devices that respond are included in the initialization and system configuration and those devices that do not respond are assumed to be absent from the system. This approach has the advantage over the previous approach in that any changes to the FRUs in the system, such as adding or removing DIMM cards, will not require an accompanying update to the configuration code as such changes will be detected when the configuration processor queries all possible available components.

However, one disadvantage of having the configuration processor check all possible device addresses is that such an operation can substantially delay the configuration and initialization processes because the configuration processor must wait for responses from all possible devices in the system. Further, if the system is reconfigured in a manner that is not in the possible configurations indicated in the configuration code, then the configuration processor will not detect the new arrangement unless the configuration code is updated with the capabilities of the new architecture. For instance, if the configuration code indicated that at most there may be 32 DIMM cards on four I$^2$C busses within a riser card and a card was added that would permit 64 DIMM cards on eight different I$^2$C bus interfaces, then the configuration code would have to be updated to reflect all possible 64 DIMM addresses where cards may be added.

Thus, there is a need in the art for an improved technique for configuring a system to determine available components.

SUMMARY OF THE PREFERRED EMBODIMENTS

To overcome the limitations in the prior art described above, preferred embodiments disclose a method, system, and program for determining the configuration of a computer system having a planar board, a planar bus and attached planar devices. A read operation is performed on planar configuration memory indicating addresses for each planar device capable of being attached to the planar board. A read command is then sent to the address of each planar device indicated in the planar configuration memory to determine if each planar device is available. A configuration memory for each available planar device is read to determine configuration information and if there are addresses of attached devices accessible through one planar device. A read command is then sent to the address of each attached device indicated in the configuration memory of the planar device to determine configuration information for each attached device and if there are further attached devices accessible through the attached device. A read command is sent to the address of any attached device indicated in any configuration memory to determine configuration information and whether there are any further attached devices and accompanying configuration memories to consider.

In further embodiments, at least one device includes an internal bus having attached devices accessible through the internal bus. The configuration memory of the device indicates an address of the attached devices on the internal bus. In such case, read commands are sent to the attached devices using the internal bus address information in the configuration memory of the device including the internal bus.

In still further embodiments, the configuration information includes product information. Address and product information read from the configuration memory of the devices in the system is stored in memory for use during computer operations.

Preferred embodiments provide a computer architecture that optimizes the system initialization process and determination of the system configuration. Preferred embodiments provide a planar configuration processor on the planar bus interface that indicates each possible device on the planar board. Any devices attached to the planar devices or any devices attached to devices that are themselves attached to a planar device or attached device have a configuration memory that includes product information on the device and address information for any devices attached to the device. During initialization, the configuration processor can determine the configuration by determining any devices attached at a particular level and then querying the configuration memories for those attached devices to find the addresses of any further attached devices. In this way, each level of the system configuration is determined from configuration memories including information on the devices at a particular level.

The advantage of the preferred embodiments is that if a device and its attached devices are replaced with a device having a different configuration, this new configuration can be detected from the configuration memory for the new device during system initialization. Furthermore, with the preferred embodiments, the configuration processor only sends read commands to existing devices as the address of devices in the system are determined from configuration memories on each device that include self-defining information on the device and actual attached devices. In this way, the preferred configuration memory architecture minimizes the number of read operations needed to dynamically determine system configuration operations.

BRIEF DESCRIPTION OF THE DRAWINGS

Referring now to the drawings in which like reference numbers represent corresponding parts throughout:

FIG. 3 illustrates an example of the configuration memory attached to the planar bus;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 7A:
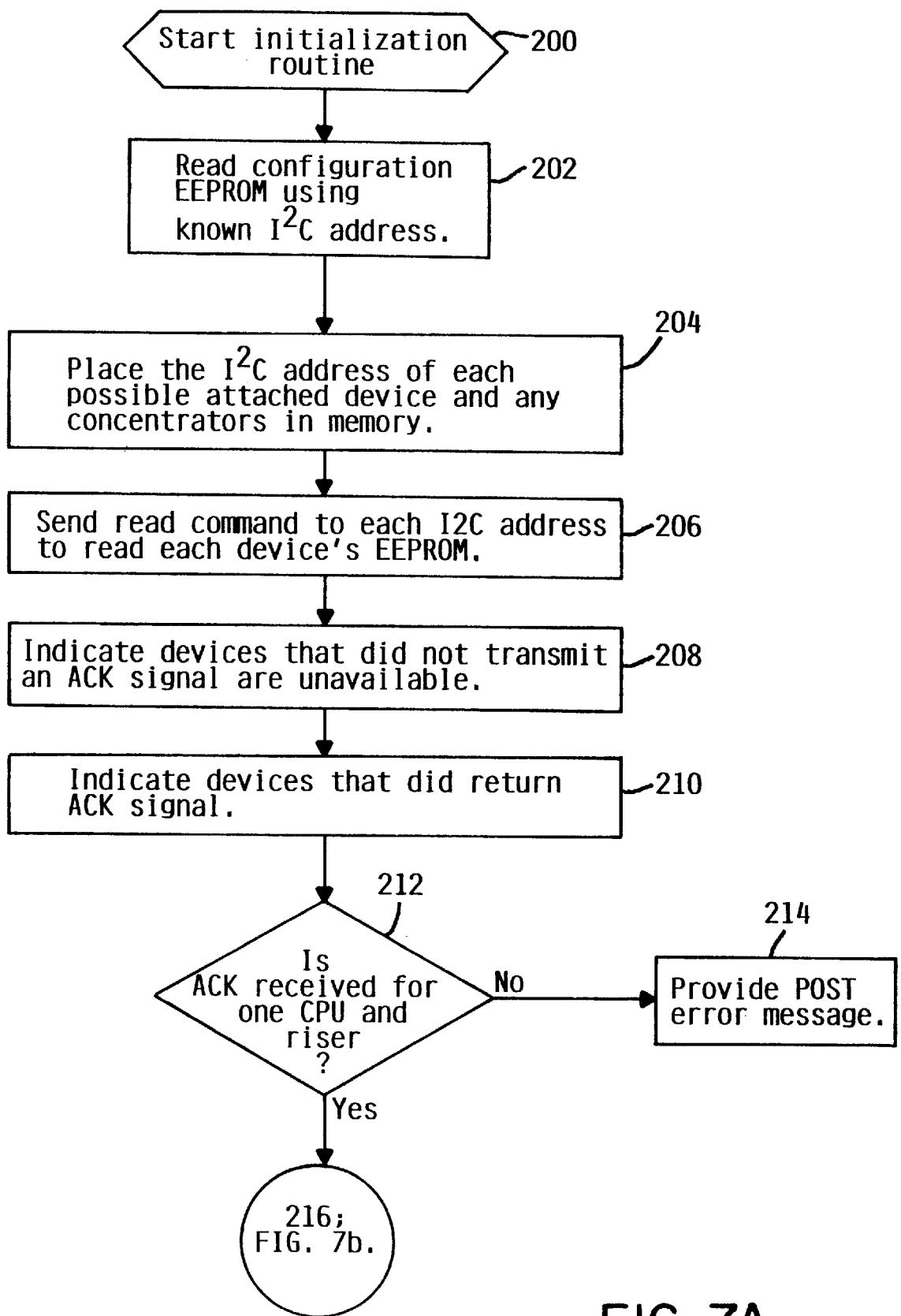
FIGS. 7a, b illustrate logic implemented in the configuration memory to determine system configuration in accordance with preferred embodiments of the present invention.
Figures 1, 7B:
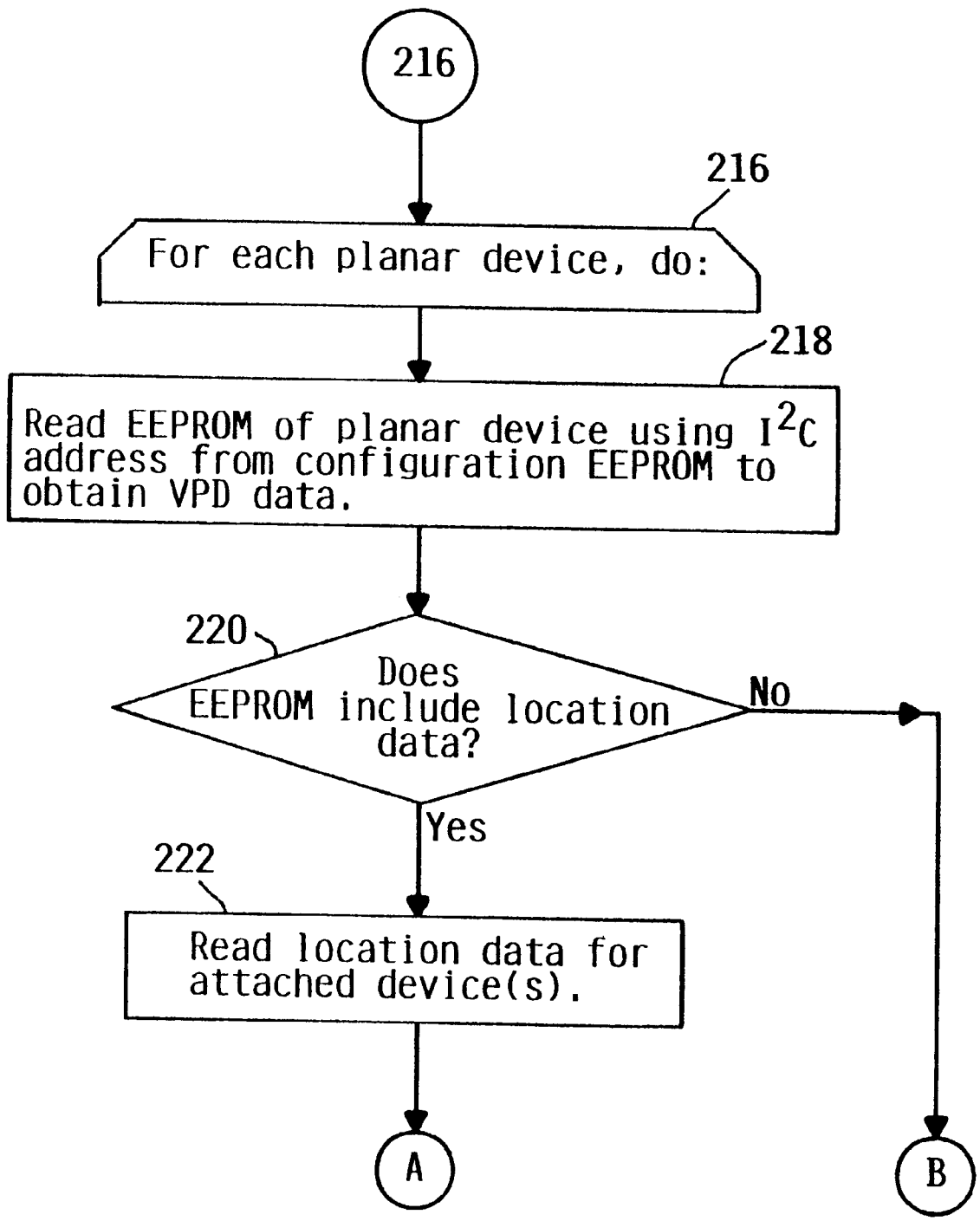
Figures 2, 7B:
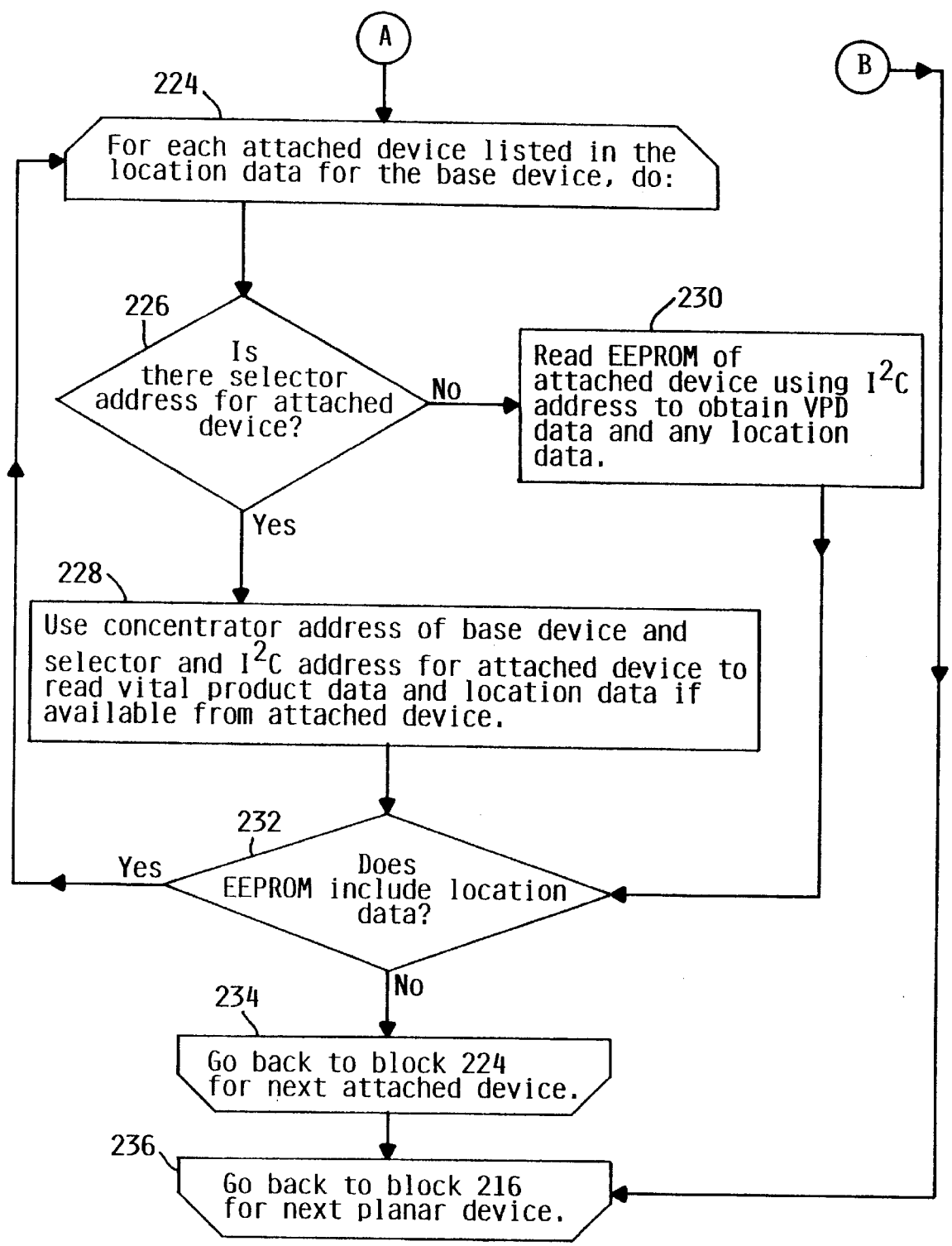

FIG. 1 illustrates a computer architecture of a planar computer board 2, i.e., backplane, in which preferred embodiments are implemented. The planar board 2 includes two central processing units (CPUs) 4, 6, an oscillator 8 to provide clock signals, a configuration processor 10 to execute the initialization routine, and riser cards 12 and 14. All of these cards plug into the planar board via card connectors. These devices communicate on a planar I$^2$C bus interface 16 in a manner known in the art. Details of the I$^2$C bus interface are described in the publication entitled "I$^2$C Bus Specification, Version 2," published by Philips Semiconductor (December 1998), which publication is incorporated herein by reference in its entirety.

Each device 4, 6, 8, 10, 12, and 14 includes an EEPROM 20, 22, 24, 26, 28, and 30, respectively, that contains vital product data (VPD) for the device, including the serial number, product number, product features, size, speed, etc. In preferred embodiments, a configuration EEPROM 32 is also attached to the planar I$^2$C bus interface 16 and includes the address information of planar devices that can be attached to the planar I$^2$C bus interface 16. However, the EEPROM 32 would not include the address of planar devices attached to the I$^2$C bus interface 16 that are plugged into another card. For instance, the address of the oscillator 8 is not included in the EEPROM 32 even though the oscillator 8 is attached to the I$^2$C bus interface 16. Instead, the address of the oscillator 8 is maintained in the EEPROM 20 of the CPU 4 into which the oscillator 8 card is plugged-in.

The devices 4, 6, 8, 10, 12, 14 themselves may include internal I$^2$C bus interfaces. The risers 12 and 14 include internal I$^2$C bus interfaces 36 and 38. Eight DIMM cards 40a–40h and 42a–42h are connected to each of the internal I$^2$C bus interfaces 36 and 38, respectively. Each DIMM card 40a–40h and 42a–42h includes its own EEPROM 44a–44h and 46a–46h, respectively, including vital product data. As discussed, the internal I$^2$C bus interfaces 36 and 38 are accessed through concentrator 48 and 50 multiplexors, respectively. In preferred implementations, each concentrator 48 and 50 can provide access to four I$^2$C bus interfaces, each I$^2$C bus interface having up to eight attached DIMM cards. In FIG. 1, only one of the internal I$^2$C bus interfaces 36 and 38 are shown attached to concentrators 48 and 50.

EEPROMs 20, 22, 24, 26, 28, and 30 on the planar I$^2$C bus interface 16 are addressable using a one byte address, where the first seven bits comprise the target device address and the least significant bit, i.e., eighth bit, indicates a read or write operation according to the I$^2$C protocol. In preferred embodiments, during the POST initialization process, the configuration processor 10 could send a read request to each of the EEPROMs 20, 22, 24, 26, 28, and 30 on planar devices 4, 6, 8, 12, and 14 using the one byte address format. If an acknowledge (ACK) pulse is received from the target device, then the configuration processor 10 knows that device is present in the system. A three byte address is used to address one of the DIMM cards 40a–40h and 42a–42h. The first byte is the address of the concentrator 48 or 50 through which the target DIMM is accessible, the second byte is the address of the internal I$^2$C bus interface 36 or 38, or the bus selector, and the third byte is the address of the target DIMM on the selected internal I$^2$C bus.

Figure 1A:
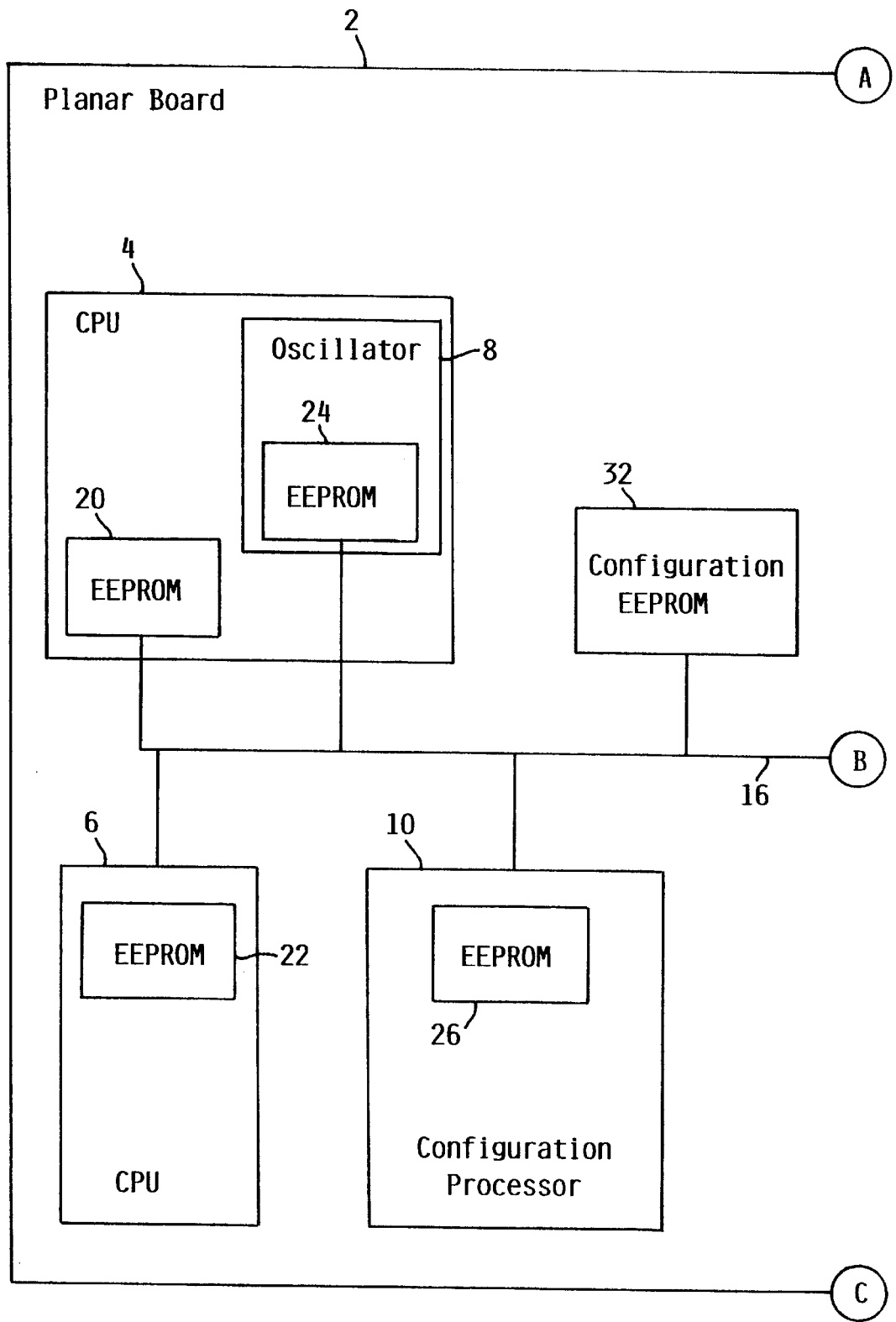
FIG. 1 is a block diagram illustrating a computer architecture in which preferred embodiments of the present invention are implemented.
Figure 1B:
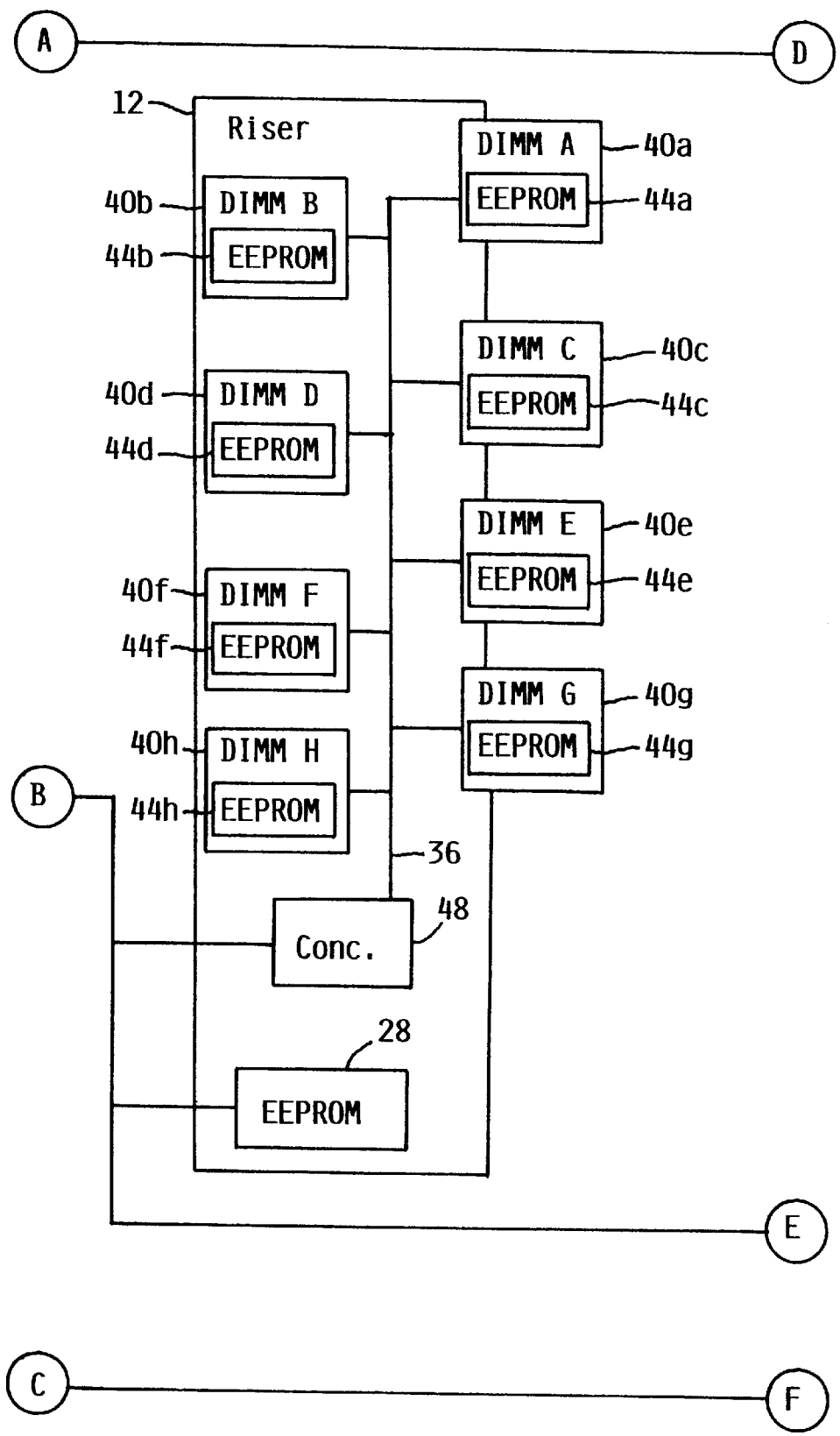
Figure 1C:
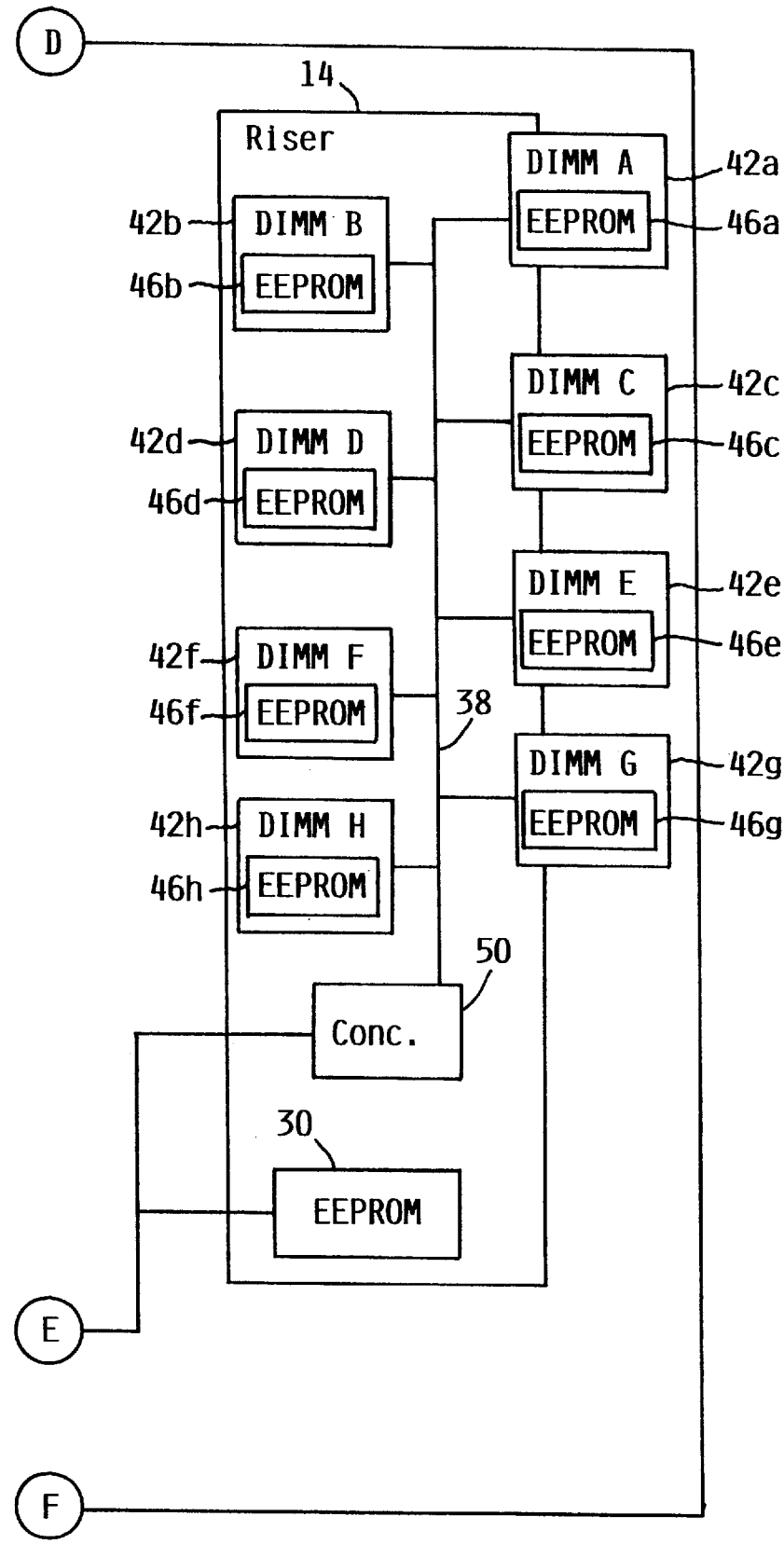
Figure 2:
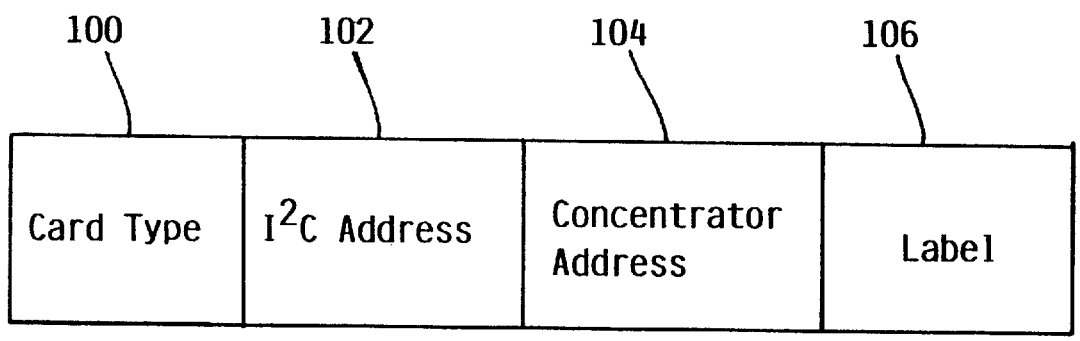
FIG. 2 illustrates fields of information that may be included within the configuration memory of a planar device in accordance with preferred embodiments of the present invention.

In preferred embodiments, the configuration EEPROM 32 includes header and vital product data for the planar board 2, and then location data for each of the components, i.e., planar devices, that may be connected on the planar I$^2$C bus interface 16. FIG. 2 illustrates the fields of information included in the location data for each planar device that connects to the planar I$^2$C bus interface 16. A card type field 100 indicates the type of device connected to the planar I$^2$C bus interface 16, e.g., CPU, configuration processor, riser, etc. An I$^2$C address field 102 indicates the address of the device on the planar I$^2$C bus interface 16. As discussed, this address is a one byte address. If alternative bus protocols are used, a different address format may also be used. The concentrator address field 104 indicates the address of a concentrator chip on the planar device if there is a concentrator chip. If there is no concentrator address, then this field 104 is not applicable. As discussed, the concentrator chip 48 and 50 provides access to further internal I²C bus interface on a card to which additional devices may be attached. A label field 106 indicates a label on the card and slot to help identify the physical location on the planar board 2 of the slot and card. The location data may further include address offset information indicating an address location for the configuration processor 10 to use to place configuration data determined from the EEPROMs.

The EEPROMs 20, 22, 24, 26, 28, 30, and 32 embedded in the devices 4, 6, 8, 10, 12, 14, and 2, respectively, would at least include header and vital product data on the features of the device. However, if the device includes any further plug-in devices attached to the planar I²C bus or an internal I²C bus interfaces having their own EEPROMs, then the EEPROM for such devices would include location data on the devices attached to either the planar I²C bus or the internal I²C bus interfaces.

Otherwise, if a device does not include any further internal I²C devices, then there would be no location data. Thus, the EEPROMs 22, 26, 44a, 44b, 44c, 44d, 44e, 44f, 44g, 44h, and 46a, 46b, 46c, 46d, 46e, 46f, 46g, 46h for the CPU 6, configuration processor 10, DIMMs 40a, 40b, 40c, 40d, 40e, 40f, 40g, 40h, and DIMMs 42a, 42b, 42c, 42d, 42e, 42f, 42g, 42h, respectively, would only include header and vital product data for the devices as there are no further devices attached thereto.

FIG. 3 illustrates an example of the data maintained in the configuration EEPROM 32 including location data 110 on the devices attached to the planar board 2. As can be seen, the riser 12 and 14 entries include information on the concentrator 48 and 50 addresses. The configuration processor 10 can use the location data 110 information in the configuration EEPROM 32 to determine the devices that may be attached to the planar board 2 via the planar I²C bus interface 16 from the I²C address field for each entry.

Figure 4:
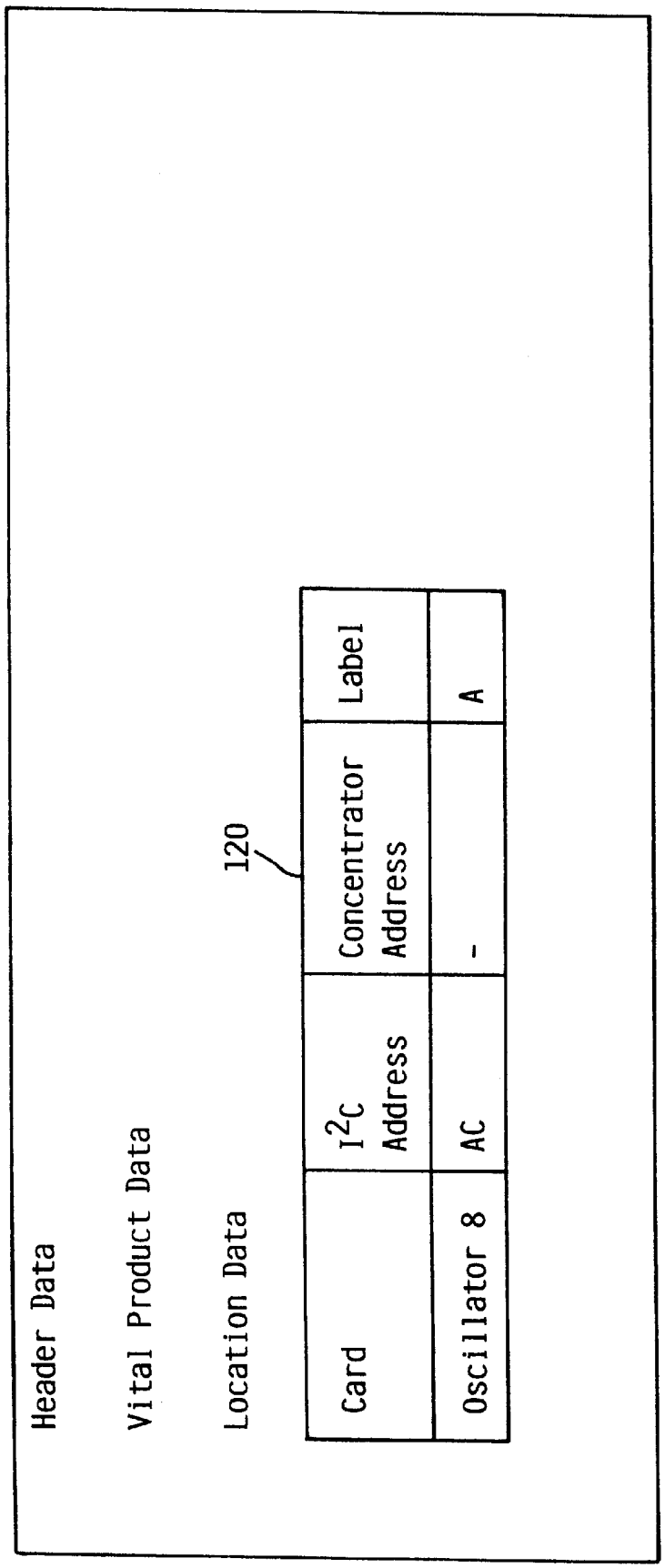
FIG. 4 illustrates an example of the configuration memory for a planar device.
Figure 5:
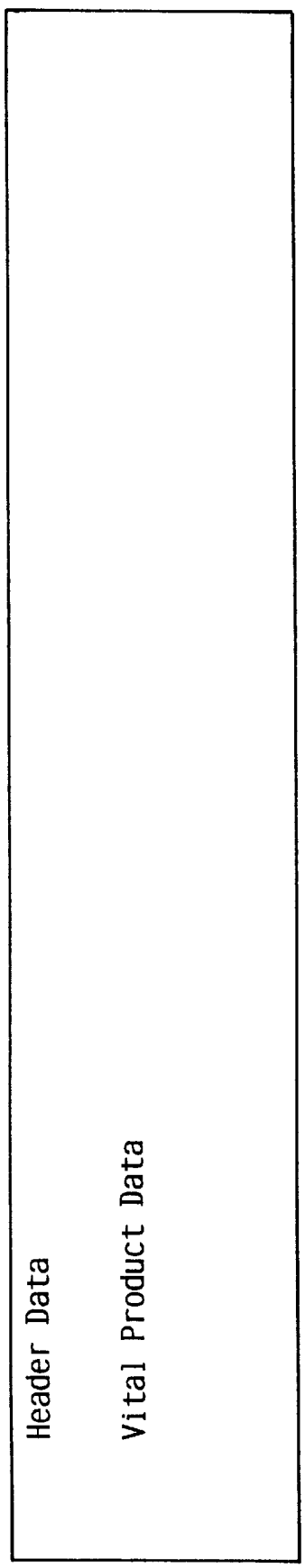
FIG. 5 illustrates an example of the configuration memory of a device attached to a planar device.

FIG. 4 illustrates the information included in the EEPROM 20 of the CPU 4. The location information 120 indicates that there is an oscillator 8 attached to the CPU 4 at I²C address on the planar I²C bus interface 16 on the CPU 4. FIG. 5 shows the information in the EEPROM 24 of the oscillator 8, which just provides vital product data. Because there are no further devices within the oscillator 8, there is no location information in the oscillator 8 EEPROM 24.

Figure 6:
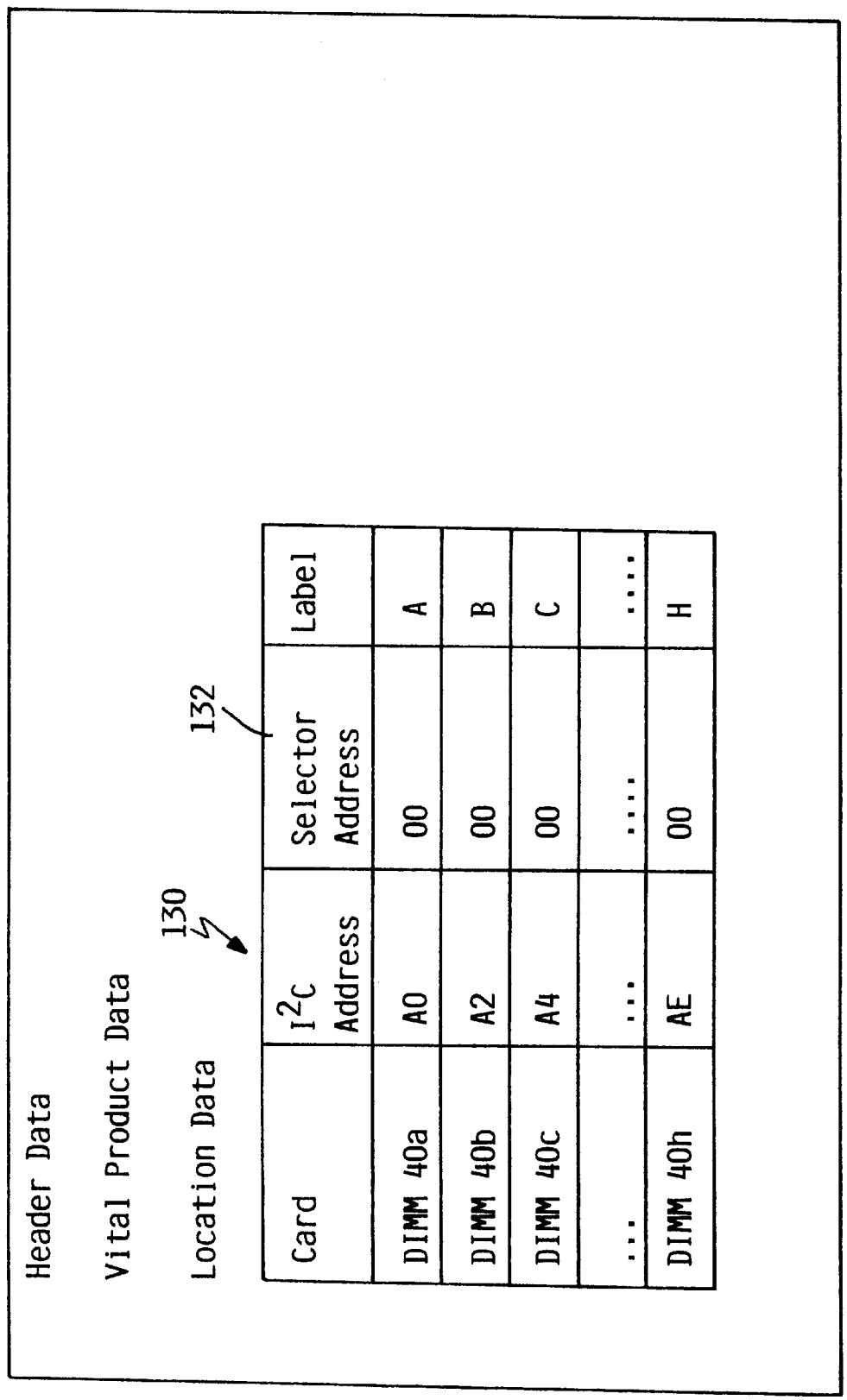
FIG. 6 illustrates an example of the configuration memory of a riser card attached to the planar interface bus.

FIG. 6 illustrates the information included in the EEPROM 28 of the riser 12, which includes location information 130 of the DIMM cards 40a, 40b, 40c, 40d, 40e, 40f, 40g, 40h attached to the internal I²C bus interface 36. The location information 130 indicates the I²C address of each DIMM 40a, b, c, d, e, f, g off the internal I²C bus interface 36. The location information 130 further includes a selector address 132 that identifies the internal I²C bus interface 36 to which the DIMM is connected. The selector address 132 is the same for all the entries as all the DIMMs 40a, 40b, 40c, 40d, 40e, 40f, 40g, 40h are connected to the same internal I²C bus interface 36. The selector address is used if there are multiple internal I²C bus interfaces connected to the concentrator 48 to distinguish the particular internal bus to which the device (DIMM) is attached.

The EEPROMs 44a, 44b, 44c, 44d, 44e, 44f, 44g, 44h of the DIMMs 40a, 40b, 40c, 40d, 40e, 40f, 40g, 40h would only include header and virtual product data and no location information as there are no devices attached to the DIMMs.

With the preferred embodiments, a configuration EEPROM 32 includes information on each possible device connected to the planar board and each device EPPROM includes self-defining information on any devices attached thereto. Any further devices on the planar bus or an internal bus could also include location information on further internal devices. The preferred embodiment technique for maintaining system configuration information allows each device to contain self-defining data that can be used to dynamically determine the configuration of any further nested internal devices.

FIGS. 7a, b illustrate logic implemented in the configuration processor 10 to determine the system configuration during initialization, such as a POST routine. Control begins at block 200 with the configuration processor 10 starting an initialization routine to determine the system configuration. The configuration processor 10 reads (at block 202) the configuration EEPROM 32 found at fixed addresses, which would include information such as shown in FIG. 3, and places (at block 204) the information about the planar board and the planar devices 2, 4, 6, 10, 12, and 14 attached to the planar board 2 via the planar I²C bus interface 16 into memory, including the I²C address of each planar device.

The configuration processor 10 then sends a read command to the I²C address of each planar device 4, 6, 10, 12, and 14 to read each devices EEPROM 20, 22, 26, 28, and 30. The configuration processor 10 will maintain information on those planar devices 4, 6, 10, 12, and 14 that did not return an ACK (acknowledge) signal (at block 208) and those that did return a signal (at block 210). Devices that do not return a signal are unavailable. If an ACK was not returned for at least one CPU 4 or 6 and at least one riser 12 or 14, then a POST error will be returned (at block 214) because the system cannot operate unless at least one CPU and memory card for system memory are available.

Otherwise, if at least one CPU and memory are available, then the configuration processor 10 begins a loop at block 216 to determine configuration information for each available planar device 4, 6, 10, 12, and 14. For each available planar device, the configuration processor 10 reads (at block 218) the vital product data (VPD) from the EEPROM 20, 22, 26, 28, and 30 and stores such data in memory as configuration information for the device. If the EEPROM includes location data (at block 220), then the configuration processor 10 reads and stores (at block 222) in memory the location of device(s) attached to the planar device, referred to as "attached devices." A device to which an attached device is attached and mentioned in the location data is a base device. There may be many levels of base and attached devices, such that a device may be both an attached device and a base device of further attached devices. The configuration processor 10 then begins an inner loop at block 224 to consider information on each attached device mentioned in the location data. If there is a selector address for the attached device (at block 226), then the configuration processor 10 addresses (at block 228) the attached device using the concentrator address provided with the location data for the base device or with the location data for the attached device, the selector address of the internal I²C bus interface off the concentrator, and the I²C address of the attached device to read vital product data and location data, if available, from the EEPROM of the attached device.

If there is no selector address, then the configuration processor 10 reads (at block 230) the EEPROM of the attached device using the I²C address alone to obtain the vital product data and any location data for the attached device. If after reading the configuration data for the attached device at block 228 or 230 location data is found, then a nested loop begins at block 224 to configure any devices attached to the attached device just considered. Thus, there may be multiple levels of nested attached devices, such that an attached device at one level may be a base device at a lower level of the configuration. If the EEPROM does not include any location data (at block 232), then control returns (at block 234) to block 224 to consider the next attached device.

For instance, the configuration processor 10 initiates a loop at block 216 to process each planar device listed in the location data 110 in FIG. 3. Upon reading the EEPROM 28 of the riser 12, the configuration processor 10 would initiate a loop at block 224 to process the location data 130 in FIG. 6 to obtain configuration information on each DIMM 40a, 40b, 40c, 40d, 40e, 40f, 40g, 40h attached to the riser card 12.

After processing all attached devices and any farther attached devices using the loop at block 224 through 232, control returns (at block 236) to process the next planar device 4, 6, 10, and 14 in the configuration EEPROM 32.

With the logic of FIGS. 7a, b and the preferred configuration data implementation, the configuration processor 10 can determine the configuration with the least number of read operations and, at the same time, have the capability to dynamically detect any changes to the system. Preferred embodiments accomplish this by including within a device self-defining configuration data on all directly attached devices to define the devices that are directly accessible through such device. In preferred embodiments, each device includes configuration information of all directly attached devices that are capable of being removed and replaced. Thus, if a base device is modified to include a new configuration of attached devices, the details of that new configuration would be included within the configuration memory of the new base device. This self-defining information allows the configuration processor to determine the exact configuration of all devices attached to a particular base device by reading the configuration information in the EEPROM of that device. This method applies to any level of attached devices. For instance, an attached device may function as a base device and include a configuration EEPROM indicating all devices removably attached to such attached device.

With the preferred implementation, the configuration processor can determine the exact configuration, including any changes to the configuration, using a minimal number of read operations because the configuration information directs the configuration processor to send read requests to devices that are actually attached to the current device being considered. If the configuration of a device is changed by adding or removing attached devices, then the configuration information in the base devices to which the changes were made would reflect that change. In fact, in preferred embodiments, the only time the configuration processor will query a component that may not be in the system is when the configuration processor queries the devices attached to the planar bus. Initially, the configuration processor reads the configuration EEPROM to determine all possible planar devices and queries each planar device to determine if the device is available and includes any further attached devices. After the planar devices, the configuration processor will only query for existing devices because the configuration processor uses the self-defining configuration data on each device that defines all directly attached devices at the next configuration level.

In this way, the configuration of a system is viewed as a hierarchical tree, where the root is the configuration EEPROM 32 and the next level comprises all planar devices. The children nodes of each planar device would comprise any devices directly attached to such planar device. Thus, any child node in the configuration tree comprises devices directly attached to the device at the previous parent node. In preferred embodiments, a device at each level in the tree includes configuration information on any children devices at the next configuration level. If devices are added or removed at a configuration level, the parent node of that modified level would indicate the changes. Thus, the configuration data in the computer system forms a configuration tree, where each level of configuration information at a device defines the configuration of all directly attached devices. This allows the configuration processor to dynamically determine the exact configuration on a level-by-level basis in the configuration tree. The number of $I^2C$ buses and the address structure of the IC EEPROM or concentrator will determine the number of addressed needed to uniquely address $I^2C$ EEPROM. Some $I^2C$ ships support only a one byte address, while other larger chips support a two byte address.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as using an $I^2C$ bus interface. However, in alternative embodiments any other bus protocol known in the art may be used to provide communication between devices.

In preferred embodiments, configuration information for a device is maintained in an EEPROM. However, in alternative embodiments, the configuration information may be maintained in any type of programmable or non-programmable non-volatile memory.

Preferred embodiments described the computer architecture as having a particular arrangement of planar devices and attached devices, i.e., the DIMNs attached to riser cards and the oscillator attached to the CPU. However, the preferred embodiment technique for determining the system configuration may apply to any computer architecture including any number and type of planar devices and attached devices.

Preferred embodiments described the location data as including particular types of address information to address a device at some level in the system, such as an I C address, concentrator address, and selector address. However, in alternative embodiments different types of address information may be provided to allow the configuration processor to address a particular device.

Preferred embodiments described the configuration EEPROM as attached directly to the planar $I^2C$ bus interface. However, in alternative embodiments the configuration EEPROM can be located at different locations in the system, such as attached to the configuration processor. Further, in preferred embodiments, the configuration memory for a device is embedded within the device. However, in alternative embodiments the configuration memory for a device may not be attached directly to the device and may be in some other location or other non-volatile memory storage area.

In summary, preferred embodiments disclose a system, method, and program for determining the configuration of a computer system having a planar board, a planar bus and attached planar devices. A read operation is performed on planar configuration memory indicating addresses for each planar device capable of being attached to the planar board. A read command is then sent to the address of each planar device indicated in the planar configuration memory to determine if each planar device is available. A configuration memory for each available planar device is read to determine configuration information and if there are addresses of attached devices accessible through the planar device. A read command is then sent to the address of each attached device indicated in the configuration memory of the planar device to determine configuration information for each attached device and if there are further attached devices accessible through the attached device. A read command is sent to the address of any attached device indicated in any configuration memory to determine configuration information and whether there are any further attached devices and accompanying configuration memories to consider.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining the configuration of a computer system having a planar board, a planar bus and planar devices attached thereto, comprising:

reading a planar configuration memory indicating addresses for each planar device capable of being attached to the planar board;

sending a read command to the address of each planar device indicated in the planar configuration memory to determine if each planar device is available;

reading a configuration memory for each available planar device to determine configuration information and if there are addresses of attached devices accessible through the planar device; and sending a read command to the address of each attached device indicated in the configuration memory for the planar device to determine configuration information for each attached device and if there are further attached devices accessible through the attached device, wherein a read command is sent to the address of any attached device indicated in any configuration memory to determine configuration information and whether there are any further attached devices and accompanying configuration memories to consider.

2. The method of claim 1, wherein the planar configuration memory is attached to the planar bus.

3. The method of claim 1, wherein the configuration memory for each device is embedded within the device.

4. The method of claim 1, wherein one device includes an internal bus having attached devices accessible through the internal bus, wherein the configuration memory of the device indicates an address of the attached devices on the internal bus, wherein read commands are sent to the attached devices using the internal bus address information in the configuration memory of the device including the internal bus.

5. The method of claim 4, wherein the device including the internal bus is a planar device, wherein the configuration memory of the planar device includes an address of a concentrator on the planar device through which multiple internal busses may be accessed, wherein the configuration information for the planar device further includes a selector address indicating the internal bus of the concentrator through which each attached devices are accessible, and wherein the read command is sent to the attached devices to read configuration information for the attached device by using the concentrator address, selector address, and internal bus address for the attached devices.

6. The method of claim 1, wherein one device has an attached device that is accessible through the planar bus, wherein the configuration memory of the device indicates an address of the attached device on the planar bus, wherein read commands are sent to the attached device using the planar bus address information in the configuration memory of the device to which the attached device is attached.

7. The method of claim 1, wherein the configuration information includes product information, further comprising storing address and product information read from the configuration memory of the devices in the system in memory for use during computer operations.

8. The method of claim 1, wherein one planar device comprises a riser card having multiple memory cards attached thereto, wherein there is a configuration memory for each memory card including product information on the memory card.

9. The method of claim 1, further comprising:

determining whether essential devices indicated in the configuration memory attached to the planar device are available; and sending an initialization error message if the essential devices indicated in the configuration memory are not available in the computer system.

10. A system for determining the configuration of a computer system, comprising:

a planar board;

a planar bus included on the planar board;

planar devices attached to the planar board via the planar bus;

one configuration memory for each planar board;

a planar configuration memory indicating addresses for each planar device capable of being attached to the planar bus;

means for sending a read command to the address of each planar device indicated in the planar configuration memory to determine if each planar device is available;

means for reading a configuration memory for each available planar device to determine configuration information and if there are addresses of attached devices accessible through the planar device; and means for sending a read command to the address of each attached device indicated in the configuration memory of the planar device to determine configuration information for each attached device and if there are further attached devices accessible through the attached device, wherein a read command is sent to the address of any attached device indicated in any configuration memory to determine configuration information and whether there are any further attached devices and accompanying configuration memories to consider.

11. The system of claim 10, wherein the planar configuration memory is attached to the planar bus.

12. The system of claim 10, wherein the configuration memory for each device is embedded within the device.

13. The system of claim 10, wherein one device includes an internal bus having attached devices accessible through the internal bus, wherein the configuration memory of the device indicates an address of the attached devices on the internal bus, wherein the means for sending read commands are to the attached devices uses the internal bus address information in the configuration memory of the device including the internal bus to address the attached devices.

14. The system of claim 13, wherein the device including the internal bus is a planar device, wherein the configuration memory of the planar device includes an address of a concentrator on the planar device through which multiple internal busses may be accessed, wherein the configuration information for the planar device further includes a selector address indicating the internal bus of the concentrator through which each attached devices are accessible, and wherein the means for sending read commands uses the concentrator address, selector address, and internal bus address to transmit read commands to the attached devices.

15. The system of claim 10, wherein one device has an attached device that is accessible through the planar bus, wherein the configuration memory of the device indicates an address of the attached device on the planar bus, wherein read commands are sent to the attached device using the planar bus address information in the configuration memory of the device to which the attached device is attached.

16. The system of claim 10, wherein the configuration information includes product information, further comprising means for storing address and product information read from the configuration memory of the devices in the system in memory for use during computer operations.

17. The system of claim 10, wherein one planar device comprises a riser card having multiple memory cards attached thereto, wherein there is a configuration memory for each memory card including product information on the memory card.

18. The system of claim 10, further comprising:
means for determining whether essential devices indicated in the configuration memory attached to the planar device are available; and
means for sending an initialization error message if the essential devices indicated in the configuration memory are not available in the computer system.

19. An article of manufacture for use in determining the configuration of a computer system having a planar board, a planar bus and planar devices attached thereto, the article of manufacture comprising program logic that is capable of causing a configuration processor to perform:
reading a planar configuration memory indicating addresses for each planar device capable of being attached to the planar board;
sending a read command to the address of each planar device indicated in the planar configuration memory to determine if each planar device is available;
reading a configuration memory for each available planar device to determine configuration information and if there are addresses of attached devices accessible through the planar device; and
sending a read command to the address of each attached device indicated in the configuration memory for the planar device to determine configuration information for each attached device and if there are further attached devices accessible through the attached device, wherein a read command is sent to the address of any attached device indicated in any configuration memory to determine configuration information and whether there are any further attached devices and accompanying configuration memories to consider.

20. The article of manufacture of claim 19, wherein one device includes an internal bus having attached devices accessible through the internal bus, wherein the configuration memory of the device indicates an address of the attached devices on the internal bus, wherein read commands are sent to the attached devices using the internal bus address information in the configuration memory of the device including the internal bus.

21. The article of manufacture of claim 19, wherein the device including the internal bus is a planar device, wherein the configuration memory of the planar device includes an address of a concentrator on the planar device through which multiple internal busses may be accessed, wherein the configuration information for the planar device further includes a selector address indicating the internal bus of the concentrator through which each attached devices are accessible, and wherein the read command is sent to the attached devices to read configuration information for the attached device by using the concentrator address, selector address, and internal bus address for the attached devices.

22. The article of manufacture of claim 19, wherein one device has an attached device that is accessible through the planar bus, wherein the configuration memory of the device indicates an address of the attached device on the planar bus, wherein read commands are sent to the attached device using the planar bus address information in the configuration memory of the device to which the attached device is attached.

23. The article of manufacture of claim 19, wherein the configuration information includes product information, further comprising storing address and product information read from the configuration memory of the devices in the system in memory for use during computer operations.

24. The article of manufacture of claim 19, wherein one planar device comprises a riser card having multiple memory cards attached thereto, wherein there is a configuration memory for each memory card including product information on the memory card.

25. The article of manufacture of claim 19, further comprising:
determining whether essential devices indicated in the configuration memory attached to the planar device are available; and
sending an initialization error message if the essential devices indicated in the configuration memory are not available in the computer system.

* * * * *